United States Patent [19]
Adams et al.

[11] Patent Number: 6,033,612
[45] Date of Patent: *Mar. 7, 2000

[54] METHOD FOR MAKING A NON-METALLIC, FIBER REINFORCED WHEEL

[75] Inventors: Thomas R. Adams, Huntington Beach; Gary R. Wittman, Costa Mesa, both of Calif.

[73] Assignee: Tiodize Company, Inc., Huntington Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/884,213

[22] Filed: Jun. 27, 1997

[51] Int. Cl.⁷ .................................................. B29C 43/18
[52] U.S. Cl. ........................... 264/258; 264/324; 301/5.3; 301/64.6; 301/64.7
[58] Field of Search ................................. 264/258, 324, 264/257; 301/5.3, 64.6, 64.7

[56] References Cited

U.S. PATENT DOCUMENTS

| | | | |
|---|---|---|---|
| 1,719,290 | 7/1929 | Danielson | 264/258 |
| 1,824,825 | 9/1931 | Mains | 264/258 |
| 1,861,125 | 5/1932 | Lytle | 264/258 |
| 1,912,083 | 5/1933 | Lytle | 264/258 |
| 1,952,811 | 3/1934 | Lytle | 264/258 |
| 1,998,964 | 4/1935 | Mansur | 264/258 |
| 2,000,769 | 5/1935 | Mansur | 264/258 |
| 2,135,380 | 11/1938 | Benge | 264/257 |
| 2,229,982 | 1/1941 | Mansur et al. | 264/324 |
| 3,828,485 | 8/1974 | McClure | 51/206 NF |
| 4,294,639 | 10/1981 | Woelfel et al. | 264/258 |
| 4,376,749 | 3/1983 | Woelfel | 264/324 |
| 4,407,772 | 10/1983 | Maglio | 264/324 |
| 4,532,097 | 7/1985 | Daniels et al. | 264/258 |
| 4,636,344 | 1/1987 | McDougall | 264/258 |
| 5,022,712 | 6/1991 | Woelfel et al. | 301/63 PW |
| 5,045,261 | 9/1991 | Weeks | 264/108 |

*Primary Examiner*—Jan H. Silbaugh
*Assistant Examiner*—Stefan Staicovici
*Attorney, Agent, or Firm*—Morland C. Fischer

[57] ABSTRACT

A method for compression molding a composite, fiber reinforced wheel. The strength, stiffness and reliability of the wheel is maximized so as to resist failure under high shear and other mechanical loads by controlling the orientation of non-metallic fibers which run through the wheel. Substantially all of the fibers in an inner bearing housing of the wheel extend circumferentially therearound, substantially all of the fibers in a cylindrical outer attachment flange run in a radial direction with respect to the wheel, and substantially all of the fibers of an intermediate rim run in an axial direction. During compression molding, some of the axial running fibers of the rim are forced towards and interspersed among some of the fibers which run circumferentially around the bearing housing so as to establish a wave-shaped mechanical interlock at the interface therebetween.

13 Claims, 3 Drawing Sheets

METHOD FOR MAKING A NON-METALLIC, FIBER REINFORCED WHEEL

BACKGROUND OF THE INVENTION

1. Field of the Invention

This invention relates to a method for making a composite, fiber reinforced wheel having particular application for use in an in-line skate. The orientation of non-metallic fibers running through the wheel is controlled to maximize stiffness and strength while enhancing the reliability of the wheel under high shear and other mechanical loads.

2. Background Art

In-line skates are becoming increasingly popular for recreational and sports activities. However, because of the environment in which these skates are used, the wheels thereof are frequently exposed to high shear and other mechanical loads. As a consequence of existing methods of manufacture, such wheels have been known to fracture or break along a shear plane or within the housing which surrounds and supports an axle bearing.

More particularly, some skate wheels have been molded from a non-metallic urethane material. However, the urethane has proven to be undesirably flexible. Consequently, the non-metallic wheels which have been manufactured in the past lack sufficient rigidity to withstand high loads, such that performance is adversely effected. Other skate wheels have been manufactured from metal (e.g. aluminum). However, it is difficult, using conventional manufacturing techniques, to easily and satisfactorily bond non-metallic (e.g. plastic) material to a metallic material to form a skate wheel. Moreover, metallic skate wheels are known to be relatively heavy and expensive to manufacture.

What is needed is a method for making a non-metallic skate wheel that will be relatively lightweight, inexpensive to produce, and sufficiently strong and stiff so as to maximize performance and reduce the risk of failure when exposed to high shear and other mechanical loads during use.

SUMMARY OF THE INVENTION

Briefly, a method is disclosed for compression molding a composite, fiber reinforced wheel that has particular application for use in an in-line skate, or the like. By virtue of controlling the orientation of non-metallic fibers that run through the skate wheel, the wheel will be characterized as being relatively lightweight and having enhanced strength, stiffness and reliability so as to resist being bent and/or broken when subjected to the high shear and other mechanical loads that normally occur during use.

A mold having opposing and reciprocating punch and base members is used to manufacture the composite wheel of the present invention. According to the preferred embodiment, the composite wheel is manufactured from S2 glass or graphite fibers that are embedded in an epoxy resin. An elongated mandrel projects upwardly from the base member so that the punch member will receive and ride over the mandrel when the punch member moves towards the base member. Initially, a layer of fiber/epoxy material is wrapped around the mandrel that projects from the base member of the press. Next, a stack of donut-shaped rings of fiber/epoxy material is placed over the mandrel and around the fiber wrap. Lastly, the opposing punch and base members of the mold are moved towards one another to apply a compressive force against the fiber wrap and donut-shaped rings which surround the mandrel.

At the conclusion of the compression molding step, a hub for a composite wheel is formed having an outer attachment flange to which a urethane covering is molded, an intermediate rim located radially inward of the attachment flange, and a hollow cylindrical inner bearing housing to surround and support a bearing for an axle of the skate in which the wheel will be used. In accordance with the present invention, substantially all of the fibers of the outer attachment flange run in a radial direction, substantially all of the fibers of the rim run in an axial direction, and substantially all of the fibers in the bearing housing run in a circumferential direction. What is more, some of the axially running fibers of the rim are pushed into the circumferentially running fibers of the bearing housing so as to establish a wave-shaped mechanical interlock at the interface therebetween and avoid the formation of a shear plane and the possibility of break-out therealong as is known to occur in conventional non-metallic wheels.

DETAILED DESCRIPTION

Figure 1:
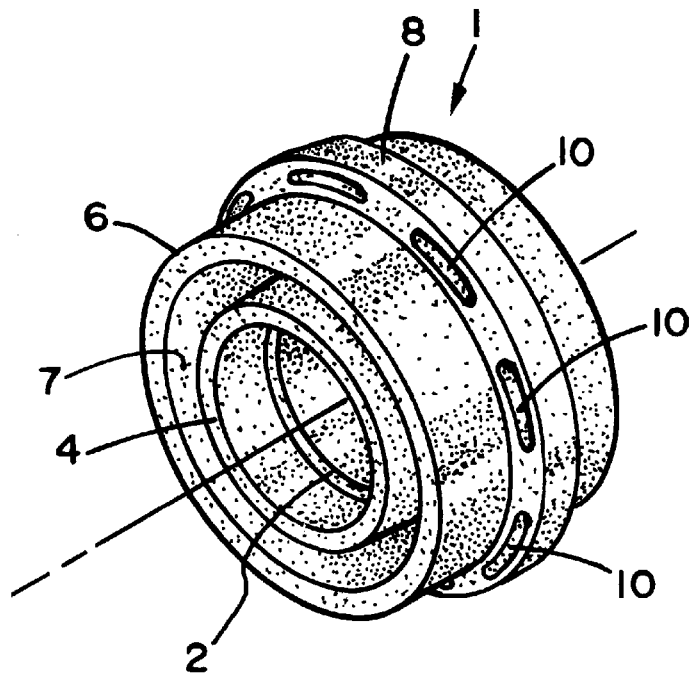
FIG. 1 shows a perspective view of the non-metallic, fiber reinforced wheel which is formed by the compression molding technique of the present invention.

Turning now to the drawings, a method is described for controlling the orientation of non-metallic fibers used to manufacture a composite, fiber reinforced wheel having particular application in an in-line skate so that the strength and stiffness of the wheel can be maximized and the reliability against failure increased. FIG. 1 shows a hub for such a wheel 1 to which the present method relates. At the radially inner-most location of the wheel 1 is a hollow, cylindrical bearing housing 2 to receive at the open interior thereof a bearing (not shown) that is adapted to support an axle of the skate. An intermediate rim 7 having a pair of spaced, generally parallel aligned side flanges 4 and 6 surrounds the bearing housing 2. A relatively narrow, outer attachment flange 8 surrounds the outer side flange 6 of the rim 7 of wheel 1, and a urethane covering (not shown) is bonded to the attachment flange 8 to complete the composite wheel. A series of slots 10 extends around the outer attachment flange 8 in the circumferential direction to serve as mechanical attachment points for the urethane and thereby reduce the stress at the interface between the urethane and the attachment flange.

Figure 3:
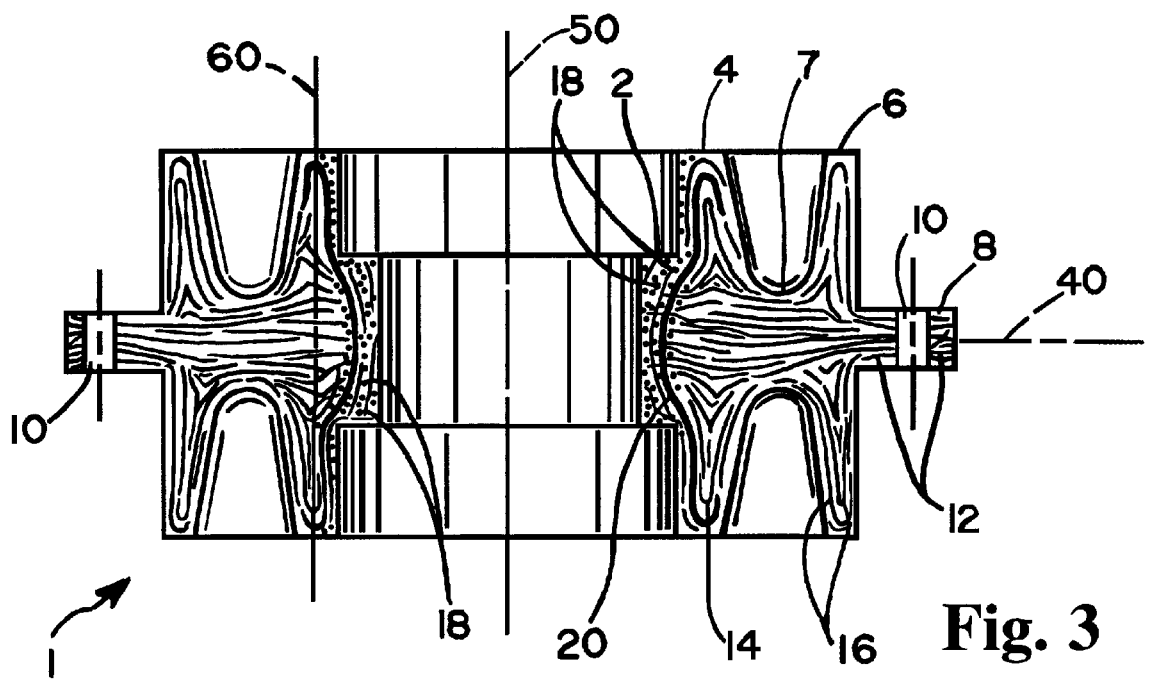
FIGS. 2 and 3 illustrate the orientation of the fibers after compression molding the wheel of FIG. 1.
Figure 2:
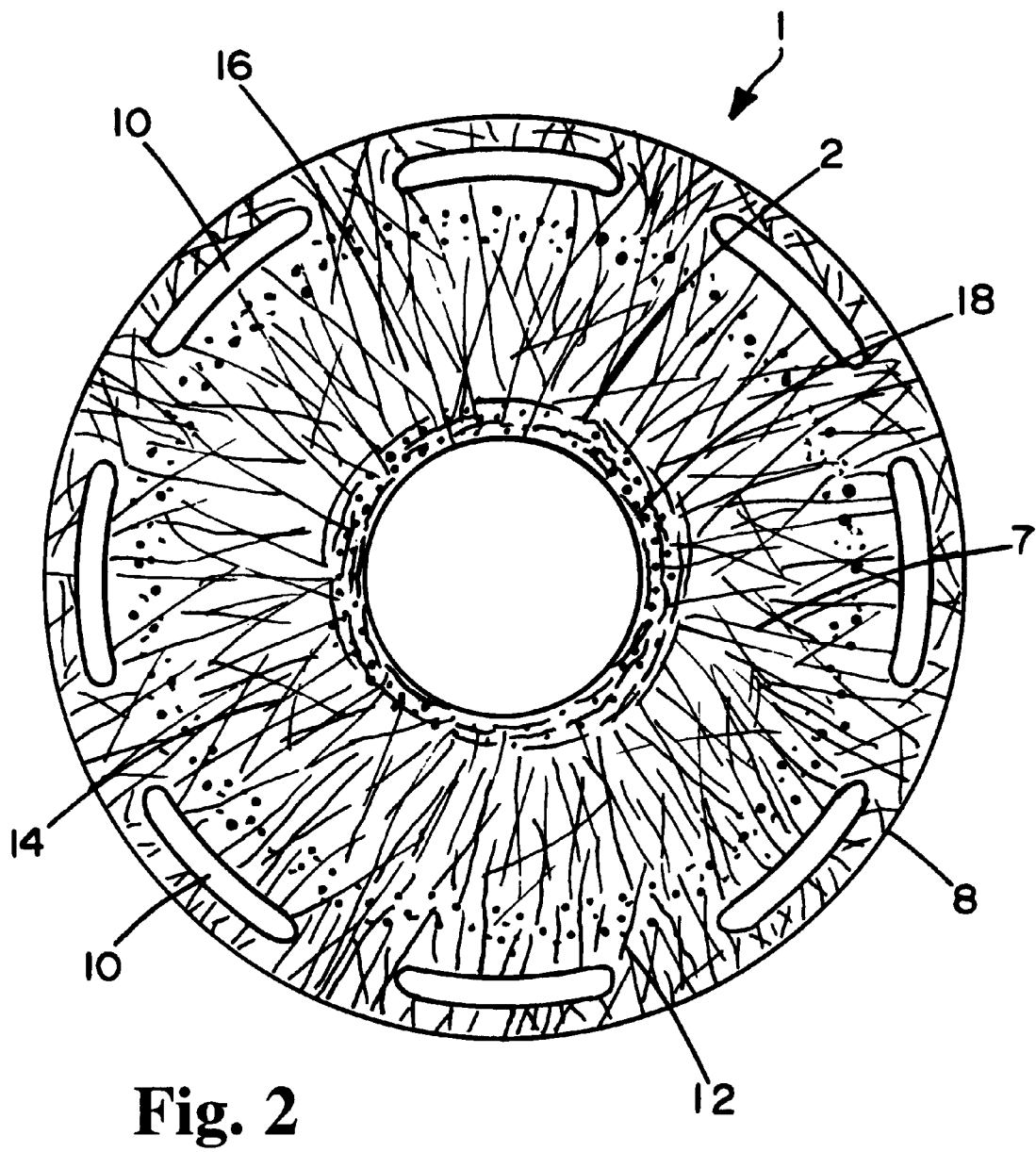

FIGS. 2 and 3 of the drawings illustrate the fiber orientation according to this invention for enhancing the strength, stiffness and reliability of the composite, fiber reinforced hub for the wheel 1 of FIG. 1 so as to be used for maximum performance in an in-line skate. In the preferred embodiment, the wheel 1 is manufactured from S2 glass or graphite fibers that are embedded in epoxy resin and undergo a compression molding step in order to realign and bend the fibers in a manner that will soon be described. The fibers typically have a length of 0.5 to 1.0 inches. The compression molding process for manufacturing the wheel 1 will be disclosed hereinafter when referring to FIG. 4.

Substantially all of the fibers or portions of the fibers 12 that run through the outer attachment flange 8 of the manufactured wheel 1 are oriented in the radial direction (i.e.

parallel to the reference line 40 in FIG. 3). From the attachment flange 8, substantially of the fibers or portions of the fibers 14 and 16 which run through the pair of side flanges 4 and 6 of the rim 7 run in the axial direction (i.e. parallel to the reference line 50 in FIG. 3). As is best shown in FIG. 3, a small number of fibers continue to run in the radial direction between the attachment flange 8 and the side flanges 4 and 6 of the rim 7 of wheel 1. However, to achieve the strength and the reliability benefits of this invention, it is intended that a majority of the fibers 14 and 16 which extend from the attachment flange 8 into the rim 7 must turn from the radial direction 40 and run in the axial direction 50 through side flanges 4 and 6.

Finally, substantially all of the fibers or portions of the fibers 18 which run through the cylindrical inner bearing housing 2 that receives an axle bearing at the hollow interior thereof are oriented in the circumferential direction (i.e. perpendicular to the directions represented by reference lines 40 and 50 in FIG. 3). The circumferentially running fibers 18 extending around the bearing housing 2 provide added structural strength to prevent breakout when the wheel 1 is subjected to stress during use in an in-line skate. As a result of the compression molding process for manufacturing the wheel 1 (to be described in greater detail when referring to FIG. 4), some of the fibers 12, 14 and 16 which run through the attachment flange 8 and the side flanges 4 and 6 of the rim 7 are forced (i.e. squeezed) towards and interspersed among some of the circumferentially running fibers 18 of the bearing housing 2. By virtue of the foregoing, and as is also best show in FIG. 3, a wave-shaped mechanical interlock 20 is established at the intersection of the circumferentially running fibers 18 of the bearing housing 2 with some of the radial and axial running fibers 12, 14 and 16 of the rim 7 and attachment flange 8.

It may be appreciated that the aforementioned wave-shaped mechanical interlock 20 is better able to accommodate shear forces to which the wheel 1 will be exposed in an in-line skate environment. That is to say, not only will delamination be less likely to occur but the interface of the circumferentially running fibers 18 with the radial and axial fibers 12, 14 and 16 is not a straight line so as to advantageously avoid the formation of a shear plane that is common to many conventional in-line skate wheels and along which such conventional wheels have been known to break and fail when exposed to high shear loads.

As has been disclosed above, a composite, fiber reinforced in-line skate wheel 1 having superior strength, stiffness and resistance to failure due to shear loads is manufactured by a compression molding technique, whereby substantially all of the fibers 18 in the inner bearing housing 2 of the wheel 1 run in the circumferential direction, substantially all of the fibers 14 and 16 in the side flanges 4 and 6 of the intermediate rim 7 run in the axial direction, and substantially all of the fibers in the cylindrical outer attachment flange 8 run in the radial direction. That is to say, the compression molded, fiber reinforced wheel 1 of this invention has fibers running in three orthogonally aligned directions. As is best shown in FIG. 2, the fibers 12 which run through the attachment flange 8 and the fibers which run through the area of the rim 7 between the side flanges 4 and 6 thereof are randomly aligned. More particularly, these areas of the wheel 1 are subjected to compression forces during manufacture such that the fibers running therethrough may not lie parallel to one another.

Figure 4:
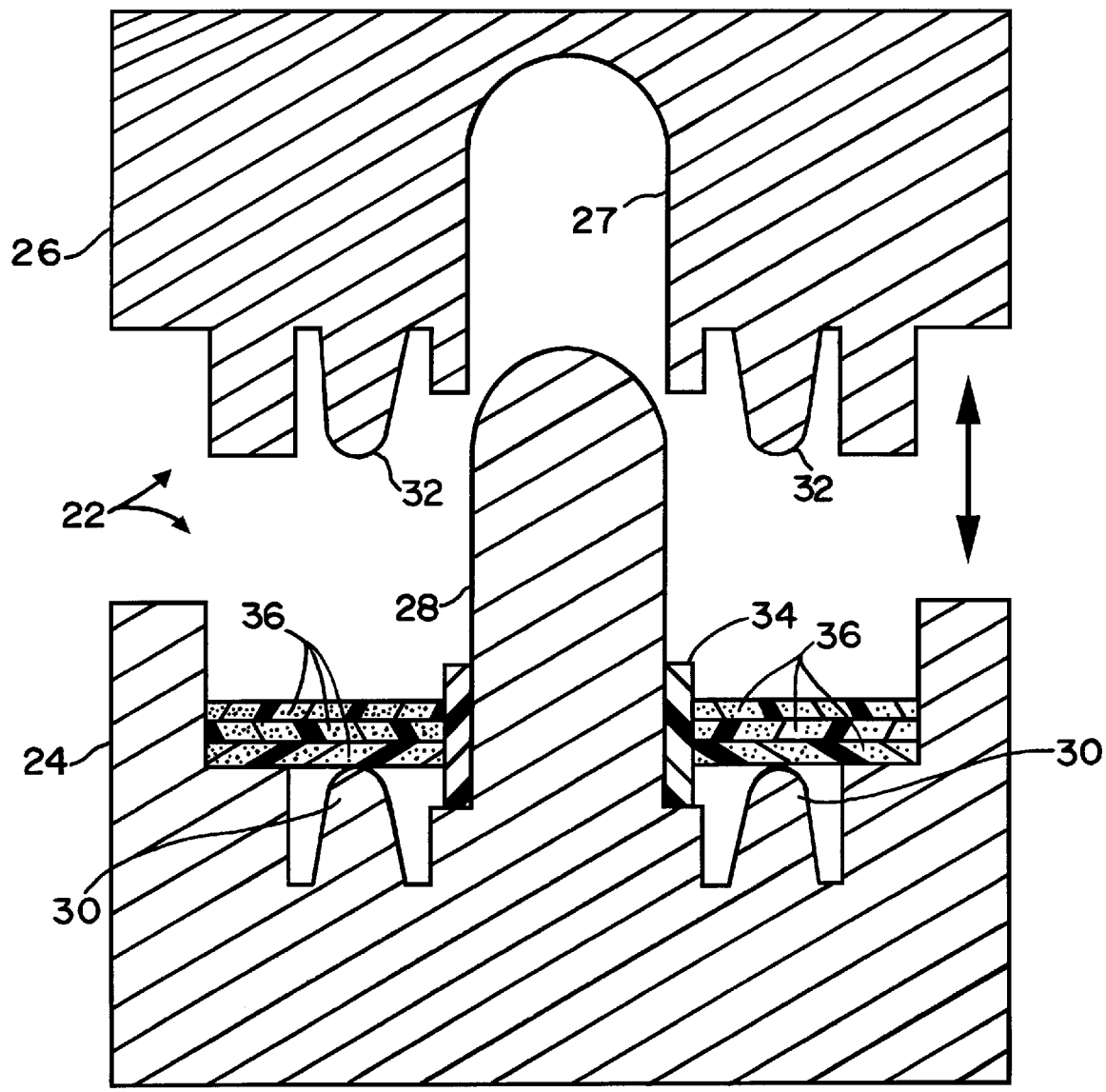
FIG. 4 shows a mold for compression molding the wheel of FIG. 1 so as to have the fiber orientation of FIGS. 2 and 3.

Referring now to FIG. 4 of the drawings, a description is provided of the compression molding technique by which to manufacture the composite, fiber reinforced hub for the skate wheel 1 of FIG. 1 having the axial, radial and circumferential fiber orientation of FIGS. 2 and 3. A mold 22 is shown having complementary reciprocating base and punch members 22 and 24 that are adapted to move towards and away from one another so as to mold the wheel 1. The punch member 26 of mold 22 includes a sleeve 27 that is sized and positioned to accommodate and ride over an elongated mandrel 28 that projects upwardly from the base member 24. The diameter of the mandrel 28 defines the inside diameter of the wheel 1. Pairs of opposing arcuate shaped protrusions 30 and 32 project towards one another from the base and punch members 22 and 24 at opposite sides of the mandrel 28 so that the bearing housing 2 and rim 7 of the wheel 1 can be shaped.

Initially, a portion of the mandrel 28 located immediately above the base portion 24 of mold 22 is surrounded by a continuous fiber/epoxy wrap 34 that will become the inner bearing housing 2 of the composite wheel 1 of FIG. 1. For a skate wheel having an outside diameter of about 2¼ inches and width of approximately one inch, the wrap 34 around mandrel 28 is a single layer that is initially ⅛ inches thick and one inch in length. Next, a stack of three to five donut shaped rings 36 are placed over the mandrel 28 and around the fiber/epoxy wrap 34 in close engagement therewith so as to be shaped and compressed into the intermediate rim 7 and the outer attachment flange 8 of the composite wheel 1. The stack of donut-shaped rings 36 is initially about ½ inches high. After compression molding, the height of the stack 36 will be reduced to about ⅛ inches in order to form the attachment flange 8.

Lastly, the punch member 26 of the mold 22 is moved towards and mated against the base member 24 so that a compressive load of about 5,000 pounds is applied to the stack of donut-shaped rings 36. Accordingly, the rings 36 are squeezed together and the (glass or graphite) fibers of the rings 36, which are initially straight, are forced to flow in the axial direction to form the side flanges 4 and 6 of the rim 7 of the composite wheel 1 of FIG. 1. Moreover, the fibers 14 and 16 of the rim 7 are urged towards the circumferentially aligned fibers of the fiber/epoxy wrap 34 that forms the bearing housing 2 of the wheel 1. The interface, prior to compression, between the stack of rings 36 and the wrap 34 surrounding the mandrel 28 of the base 24 of mold 22 is represented by the reference line 60 in FIG. 3. However, and as was earlier described, as the axially running fibers (designated 14 and 16 in FIG. 3) of the rim 7 are forced during the compression molding step towards and interspersed among the circumferentially running fibers (designated 18 in FIG. 3) of the bearing housing 2, a wave-shaped mechanical interlock (designated 20 in FIG. 3) is created to enable the composite wheel 1 to better withstand high shear loads during use.

At the conclusion of the compression molding process, the non-metallic glass or graphite fibers 14 and 16, which are originally straight in the stack of donut-shaped rings 36, are bent into the fiber orientation shown in FIG. 3 when the side flanges 4 and 6 of the rim 7 are formed. However, the fibers 12 running through the attachment flange 8 after compression are squeezed together but retain their initial straight orientation in the radial direction. The shape and size of the side flanges 4 and 6 of rim 7 of the composite wheel 1 are determined by the opposing pairs of arcuate protrusions 30 and 32 of the mold 22.

It will be apparent that while a preferred embodiment of the invention has been shown and described, various modifications and changes may be made without departing from the true spirit and scope of the invention. For example, although the compression molding technique has been disclosed above for manufacturing a high strength and light weight wheel 1 having particular application in an in-line skate, it is to be expressly understood that the disclosed method can be used for manufacturing other composite, fiber reinforced wheels which are adapted to survive high shear and other mechanical loads, such as those that may be experienced by a cart, carriage, skateboard, and the like.

Having thus set for the preferred embodiment, what is claimed is:

1. A method for making a high strength, non-metallic wheel from a fiber reinforced composite material in which fibers are embedded and from which said wheel is formed such that the wheel has an outer attachment flange to receive a covering thereover, an inner cylindrical bearing housing to receive an axle bearing, and an intermediate rim, said fibers of said fiber reinforced composite material running through each of said attachment flange, said inner cylindrical bearing housing, and said rim, said method including the steps of:

forming said inner cylindrical bearing housing by wrapping an elongated mandrel with a layer of said fiber reinforced composite material and compression molding said layer of fiber reinforced composite material so that said layer of fiber reinforced composite material is flattened around said mandrel; and forming said outer attachment flange and said intermediate rim by locating a stack of donut-shaped rings of said fiber reinforced composite material over said elongated mandrel and in surrounding engagement with said layer of composite material that is wrapped around the mandrel, and compression molding said stack of donut-shaped rings to flatten a first portion of said stack to form said attachment flange and shaping the remaining portion of said stack to form said rim.

2. The method recited in claim 1, including the additional step of making the fibers in said fiber reinforced composite material from S2 glass.

3. The method recited in claim 1, including the additional step of making the fibers in said fiber reinforced composite material from graphite.

4. The method recited in claim 1, wherein said high strength, non-metallic wheel has a first axis extending in an axial direction and a second axis extending in a radial direction, wherein the step of compression molding the first portion of said stack of donut shaped rings to form said attachment flange also causes a majority of the fibers running through said attachment flange to extend in said radial direction and in parallel alignment with said second axis.

5. The method recited in claim 4, wherein the step of shaping the remaining portion of said stack of donut shaped rings to form said rim also causes a majority of the fibers running through said rim to extend in said axial direction and in parallel alignment with said first axis.

6. The method recited in claim 5, wherein the step of compression molding said layer of fiber reinforced composite material to form said cylindrical bearing housing also causes a majority of the fibers running through said cylindrical bearing housing to extend circumferentially and in a direction which is aligned perpendicular with respect to said axial direction and said radial direction of said first axis and said second axis, respectively.

7. The method recited in claim 1, wherein the step of compression molding the first portion of said stack of donut shaped rings to form said attachment flange and shaping the remaining portion of said stack of donut-shaped rings to form said rim also causes a majority of the fibers of the fiber reinforced composite material running through said attachment flange to extend radially in said high strength, non-metallic wheel, and also causes a majority of the fibers of said fiber reinforced composite material running through said rim to extend axially in said wheel.

8. The method recited in claim 7, wherein the step of compression molding said stack of donut-shaped rings causes at least some of the axially extending fibers running through said rim to be forced towards and interspersed among at least some of the circumferentially extending fibers running through said inner cylindrical bearing housing to establish a mechanical interlock therebetween.

9. A method for making a high strength, non-metallic wheel from non-metallic fibers in a fiber reinforced composite material from which said wheel is formed such that the wheel has an outer attachment flange to receive a covering thereover, an inner cylindrical bearing housing to receive an axle bearing, and an intermediate rim, the non-metallic fibers of said fiber reinforced composite material running through each of said attachment flange, said bearing housing, and said rim, said method including the step of compression molding said fiber reinforced composite material so that a majority of the non-metallic fibers running through said outer attachment flange extends in a radial direction, a majority of the non-metallic fibers running through said intermediate rim extends in an axial direction, and a majority of the non-metallic fibers running through said inner cylindrical bearing housing extends circumferentially.

10. The method recited in claim 9, wherein some of said axially running fibers of the intermediate rim are pushed into some of said circumferentially running fibers of the inner cylindrical bearing housing so as to establish a mechanical interlock at an interface of said axially running fibers and said circumferentially running fibers.

11. The method recited in claim 10, wherein the interface of said axially running fibers and said circumferentially running fibers has a wave shape to avoid the formation of a shear plane along said interface.

12. The method recited in claim 9, wherein said non-metallic fibers of said fiber reinforced composite material are formed from glass.

13. The method recited in claim 9, wherein said non-metallic fibers of said fiber reinforced composite material are formed from graphite.

* * * * *